United States Patent
Bassick et al.

(10) Patent No.: US 6,729,643 B1
(45) Date of Patent: May 4, 2004

(54) DRIVER NECK SUPPORT AND HEAD RESTRAINT

(75) Inventors: John W. Bassick, Paxton, MA (US);
Edward A. DuBois, Auburn, MA (US);
Daniel M. Barry, Oxford, MA (US)

(73) Assignee: David Clark Company, Inc., Worcester, MA (US)

( * ) Notice: Subject to any disclaimer, the term of this patent is extended or adjusted under 35 U.S.C. 154(b) by 5 days.

(21) Appl. No.: 10/087,499

(22) Filed: Mar. 1, 2002

Related U.S. Application Data

(60) Provisional application No. 60/274,112, filed on Mar. 8, 2001.

(51) Int. Cl.⁷ .............................. B60R 21/18; A42B 3/08
(52) U.S. Cl. .................... 280/730.1; 280/733; 280/808; 2/413; 2/421; 297/484
(58) Field of Search ........................... 280/730.1, 733, 280/801.1, 808, 290; 180/268, 271; 2/411, 413, 421, 468, 461; 297/465, 484

(56) References Cited

U.S. PATENT DOCUMENTS

| | | | | |
|---|---|---|---|---|
| 4,638,510 A | * | 1/1987 | Hubbard ........................ 2/6.1 |
| 5,039,035 A | * | 8/1991 | Fitzpatrick ........... 244/122 AG |
| 5,133,084 A | * | 7/1992 | Martin ........................ 2/468 |
| 5,272,770 A | * | 12/1993 | Allen et al. ..................... 2/421 |
| 5,282,648 A | * | 2/1994 | Peterson ..................... 280/733 |
| 5,402,535 A | * | 4/1995 | Green ........................... 2/468 |
| 5,758,900 A | * | 6/1998 | Knoll et al. ................ 280/733 |
| 6,009,566 A | * | 1/2000 | Hubbard ....................... 2/468 |
| 6,237,945 B1 | * | 5/2001 | Aboud et al. .............. 280/733 |

\* cited by examiner

*Primary Examiner*—David R. Dunn
(74) *Attorney, Agent, or Firm*—Cauthier & Connors; Maurice E. Gauthier

(57) ABSTRACT

For use in a high performance racing vehicle or the like in which the torso of a driver is restrained in a seat by a harness that includes shoulder straps extending over the driver's shoulder, and a helmet is worn by the driver, a neck support and head restraint device comprises an inflatable collar configured and dimensioned to surround the driver's neck at a location between the driver's helmet and shoulders. The collar is anchored to the shoulder straps of the restraining harness. At least one and preferably two tethers are strategically connected at opposite ends to the collar and the helmet. The collar is normally in a pliable collapsed state, with the tethers loosely extending between the helmet and collar to thereby accommodate relatively unimpeded head movement. In an emergency situation, the collar is instantaneously inflated to a relatively stiff expanded state that tensions the tethers, resulting in the rear portion of the helmet being pulled down against the collar to thereby provide beneficial neck support and head restraint.

5 Claims, 3 Drawing Sheets

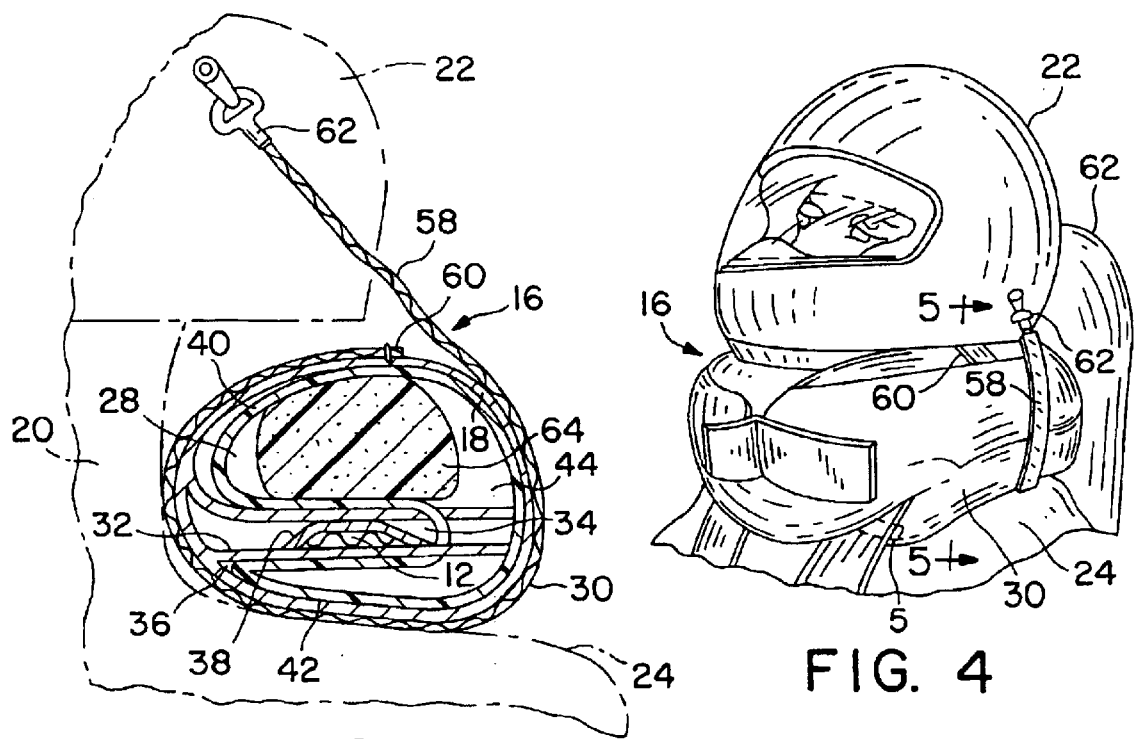
FIG. 3
FIG. 4
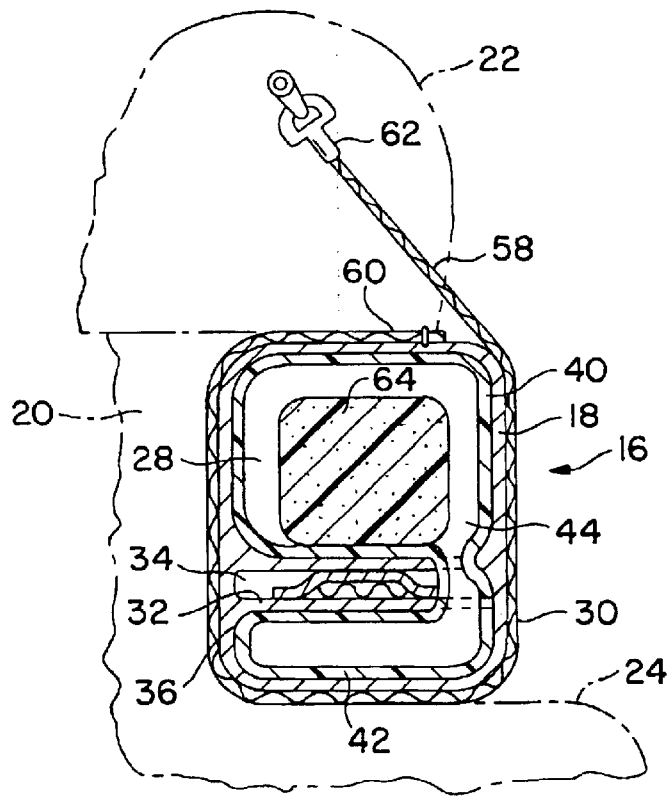
FIG. 5

DRIVER NECK SUPPORT AND HEAD RESTRAINT

CROSS REFERENCE TO RELATED APPLICATION

This application claims priority from provisional patent application Ser. No. 60/274,112 filed Mar. 08, 2001.

BACKGROUND OF THE INVENTION

1. Field of the Invention

The present invention relates to an improved neck support and head restraint device for the helmeted drivers of high a performance racing vehicle or the like.

2. Description of the Prior Art

When a race car crashes, usually with another car or against a retaining wall, the rapid deceleration creates a surge of energy many times the force of gravity, commonly referred to as a "G-spike". At the moment of impact, the driver's pelvis and torso are restrained from continuing forward by a system of harnesses, which typically employ both lap and shoulder straps at a minimum. However, the driver's helmeted head continues to move forward until restrained by the neck, which acts as the sole tether. When the neck is stretched to its maximum, the base of the skull is subjected to tremendous stress, resulting either in a fracture at the base, or a breaking of the neck. The resulting damage is frequently extensive, and often fatal.

Those skilled in the art have attempted to address this problem by developing devices of the type disclosed, for example, in U.S. Pat. No. 4,638,510 (Hubbard) and U.S. Pat. No. 6,009,566 (Hubbard). While such devices do provide beneficial head restraint, they do so at a driver performance cost, namely, restriction of freedom of head movement, which many drivers find objectionable.

SUMMARY OF THE INVENTION

The present invention is designed for use in a racing environment, where a helmeted driver is restrained in a seat by a harness that includes shoulder straps. The invention provides critical neck support and head restraint only when needed, at the time an emergency occurs, and at all other times, remains in a passive state, allowing a full range of head movement.

In accordance with the present invention, an inflatable collar is configured and dimensioned to surround the driver's neck at a location between the driver's helmet and shoulders. The collar is anchored to the shoulder straps of the restraining harness. At least one and preferably two tethers are strategically connected at opposite ends to the collar and the helmet. The collar is normally in a pliable collapsed state, with the tethers loosely extending between the helmet and collar to thereby accommodate relatively unimpeded head movement. In an emergency situation, e.g., vehicle collision or roll over, the collar is instantaneously inflated to a relatively stiff expanded state that tensions the tethers, resulting in the rear portion of the helmet being pulled down against the collar and to thereby provide beneficial neck support and head restraint.

These and other features and advantages of the present invention will now be described in greater detail with reference to the accompanying drawings, wherein:

BRIEF DESCRIPTION OF THE DRAWINGS

FIG. 3 is a sectional view taken along line 3—3 of FIG. 1;

FIG. 4 is a perspective view showing the device of the present invention in an inflated state; and FIG. 5 is a sectional view taken along line 5—5 of FIG. 4.

Figure 1:
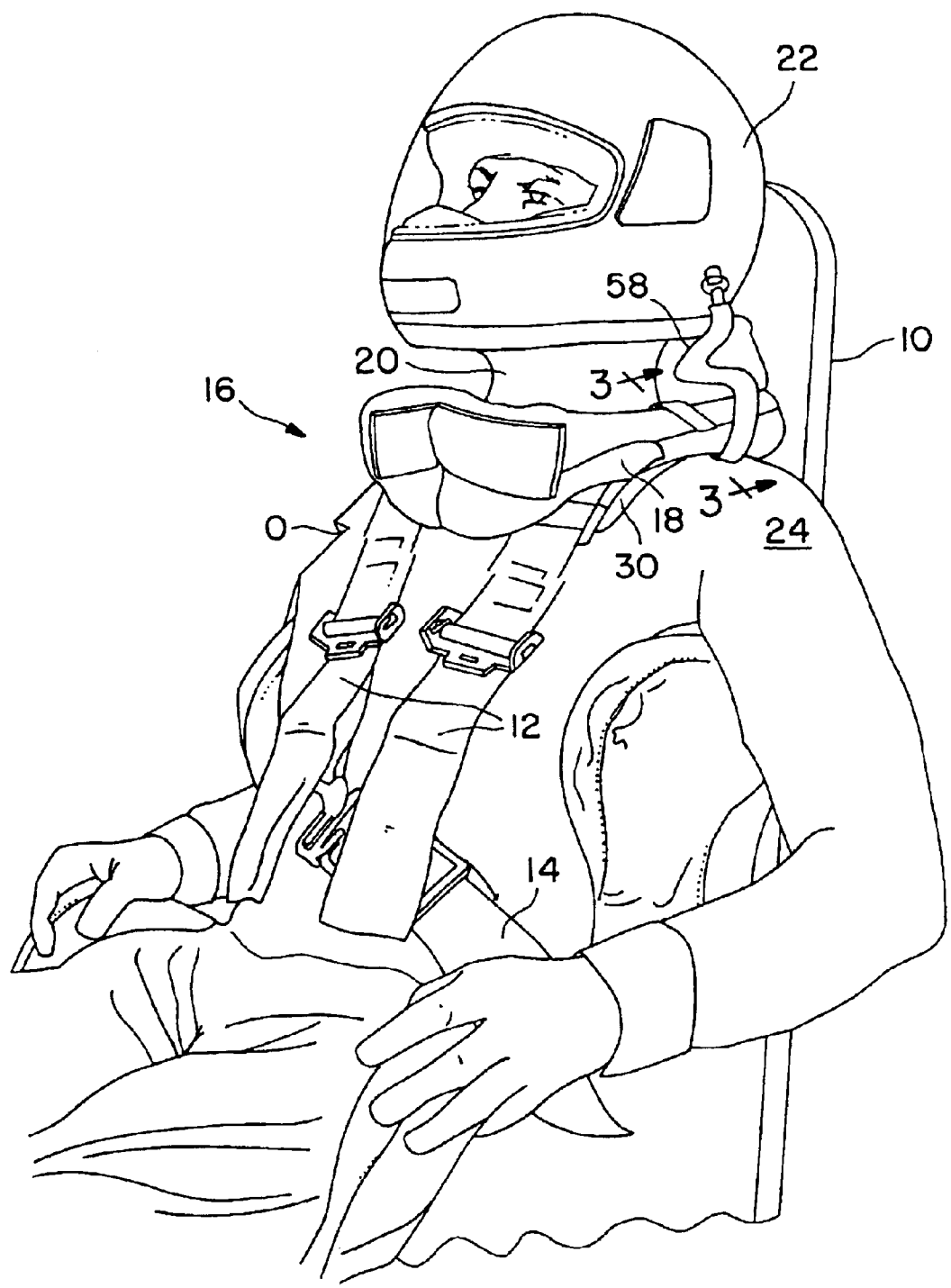
FIG. 1 is a perspective view showing a helmeted driver strapped into the seat of a high performance racing vehicle, and wearing a neck support and head restraint device in accordance with the present invention, with the device in a collapsed passive state allowing relatively unrestrained freedom of head movement.

Referring initially to FIG. 1, a helmeted vehicle driver "O" is shown strapped into a seat 10 by a harness which includes shoulder straps 12 and a lap belt 14. A neck support and head restraint device in accordance with the present invention is generally depicted at 16 and includes a pliable collar 18 configured and dimensioned to surround the driver's neck 20 between the helmet 22 and the driver's shoulders 24.

Figure 2:
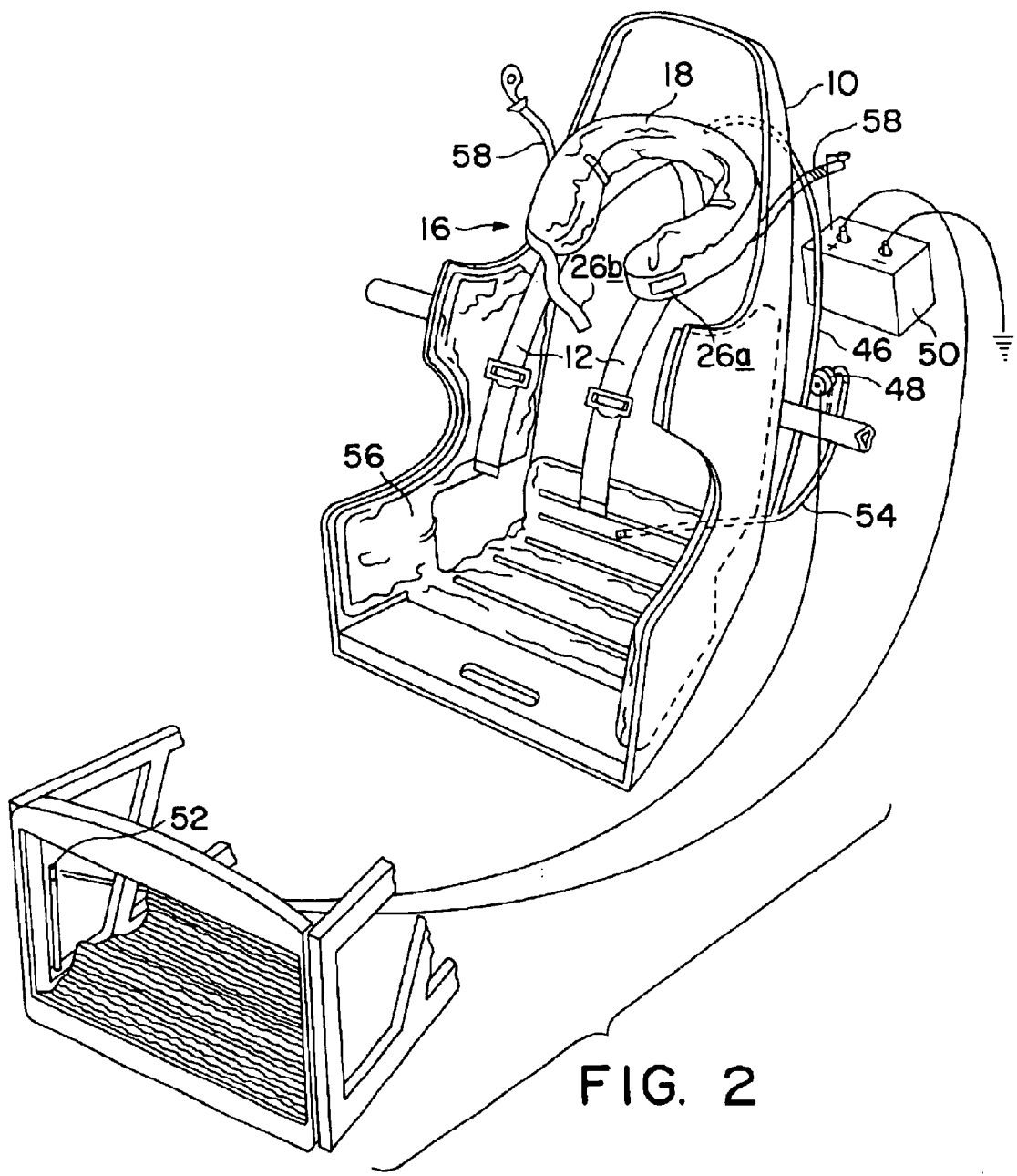
FIG. 2 is a perspective somewhat diagrammatic view showing the neck support and head restraint device of the present invention, and its associated seat restraints and inflation and control components.

It will be seen from FIG. 2 that the collar 18 is generally horseshoe-shaped, having ends that may be separated when donning the collar. Once the collar is donned, the ends are connected by any convenient means, such as for example Velcro straps 26a, 26b. With additional reference to FIG. 3, it will be seen that the collar is tubular to thereby define an upper compartment 28. In the shoulder areas, the collar has depending inflatable pads 30. Each pad is internally subdivided by a shelf 32 into intermediate and lower compartments 34, 36, both of which share a common internal volume with the main tubular section of the collar. Each harness shoulder strap 12 extends through the intermediate compartment 34 and is located and held down against the shelf 32 by a web 38.

An inflatable bladder has a relatively large upper portion 40 coextensive with and contained within the upper compartment 28, and a smaller lower portion 42 contained in the lower compartment 36, with the upper and lower portions 40, 42 being in fluid communication with leach other via a connecting portion 44.

It will be seen from FIG. 2 that the upper bladder portion is connected via a supply hose 46 to an inflation module 48. Module 48 is powered by the vehicle battery 50 or other DC source and is controlled by a trigger switch 52. Inflation module 48 may also be connected by a branch hose 54 to an inflatable seat cushion 56.

Tethers 58 are connected to the collar 18 as at 60. The tethers 58 are wrapped around the collar 18 and the underlying pads 30 before extending upwardly to be detachably connected by buckles 62 to opposite sides of the helmet 22.

Under normal conditions, the collar remains collapsed and pliable as shown in FIGS. 1 and 2, with the tethers 58 being relatively loose, and with ample space being provided between the collar 18 and the helmet 22 to accommodate both side to side and up and down head movement.

If the trigger switch 52 is activated, for example by a vehicle collision or roll over, the inflation module 48 instantaneously inflates the bladder, causing the collar to expand and stiffen to the condition shown in FIGS. 4 and 5. The space between the helmet 22 and the driver's shoulders 24 is completely filled by the collar 18 and pads 30, and the tethers 58 are tensioned to pull the rear of the helmet downwardly against the inflated collar. The resulting forces exerted by the tensioned tethers 58, by virtue of their design length, resist inertial forces tending to forwardly propel the driver's head, thus safeguarding the driver from injuries that might otherwise result.

In order to accelerate inflation, the upper compartment may either be partially pressurized or partially filled, for example with a flexible insert 64 of open pore polyurethane foam of the type marketed under the trademark DRYFAST by M.H. Stallman of Providence, R.I.

We claim:

1. For use in a high performance racing vehicle or the like in which the torso of a driver is restrained in a seat by a harness that includes shoulder straps extending over the driver's shoulders, and a helmet is worn by the driver, a neck support and head restraint device comprising:

an inflatable collar configured and dimensioned to surround the driver's neck at a location between said helmet and the driver's shoulders, means for anchoring said collar to the shoulder straps of said harness, at least one tether having a first end connected to said collar, said tether extending around said collar from said first end to a second end connected to a rear portion of said helmet; and means for inflating said collar from a pliable collapsed state to a relatively stiff expanded state, the relative dimensions and arrangement of said tether and said collar being such that when said collar is in said collapsed state, said tether extends loosely between said collar and said helmet, and when said collar is in said expanded state, said tether is tensioned, resulting in the rear portion of said helmet being urged against said collar.

2. The neck support and head restraint device of claim 1 wherein said tether is wrapped around at least a portion of the exterior surface of said collar.

3. The neck support and head restraint device of claims 1 or 2 wherein two tethers are connected to opposite sides of the rear portion of said helmet.

4. The neck support and head restraint device of claims 1, 2 or 3 wherein inflatable portions of said collar are interposed between said shoulder straps and the shoulders of the driver.

5. For use in a high performance racing vehicle or the like in which the torso of a driver is restrained in a seat by a harness that includes shoulder straps extending over the driver's shoulder, and a helmet is worn by the driver, a neck support and head restraint device comprising:

an inflatable collar configured and dimensioned when in a pliable collapsed state to loosely surround the driver's neck at a location between said helmet and the driver's shoulders, means for anchoring said collar to the shoulder straps of said harness, a pair of tethers at least partially wrapped around said collar, said tethers having first ends connected to said collar and having second ends connected to the rear of said helmet on opposite sides thereof; and means for inflating said collar from said pliable collapsed state to a relatively stiff expanded state, the relative dimensions and arrangements of said tethers and said collar being such that when said collar is in said collapsed state, said tethers extend loosely between said collar and said helmet, and when said collar is in said expanded state, said tethers are tensioned, resulting in the rear of said helmet being urged against said collar.

* * * * *